(12) United States Patent
Walker et al.

(10) Patent No.: US 6,415,264 B1
(45) Date of Patent: Jul. 2, 2002

(54) SYSTEM AND METHOD FOR DETERMINING A POSTING PAYMENT AMOUNT

(75) Inventors: Jay S. Walker, Ridgefield; Andrew S. Van Luchene, Norwalk, both of CT (US); Deirdre O'Shea, New York, NY (US)

(73) Assignee: Walker Digital, LLC, Stamford, CT (US)

( * ) Notice: Subject to any disclaimer, the term of this patent is extended or adjusted under 35 U.S.C. 154(b) by 0 days.

(21) Appl. No.: 09/285,472

(22) Filed: Apr. 2, 1999

Related U.S. Application Data

(63) Continuation-in-part of application No. 08/964,967, filed on Nov. 5, 1997, which is a continuation-in-part of application No. 08/889,319, filed on Jul. 8, 1997.

(51) Int. Cl.[7] .............................................. C06F 17/60
(52) U.S. Cl. ............................................................ 705/26
(58) Field of Search ...................................... 705/26, 30

(56) References Cited

U.S. PATENT DOCUMENTS

| | | |
|---|---|---|
| 3,573,747 A | 4/1971 | Adams et al. |
| 3,581,072 A | 5/1971 | Nymeyer |
| 4,833,607 A | 5/1989 | Dethloff et al. ............... 705/14 |
| 5,283,731 A | 2/1994 | Lalonde et al. ............. 364/401 |
| 5,297,026 A | 3/1994 | Hoffman |
| 5,414,621 A | 5/1995 | Hough ........................ 705/10 |
| 5,664,111 A | 9/1997 | Nahan et al. .................. 705/27 |
| 5,715,402 A | 2/1998 | Popolo |
| 5,732,400 A | 3/1998 | Mandler et al. .............. 705/26 |
| 5,745,882 A | 4/1998 | Bixler et al. .................. 705/26 |
| 5,758,328 A | 5/1998 | Giovannoli |
| 5,794,207 A | 8/1998 | Walker et al. |
| 5,794,210 A | 8/1998 | Goldhaber et al. |
| 5,794,219 A | 8/1998 | Brown |
| 5,825,881 A | 10/1998 | Colvin, Sr. |
| 5,826,244 A | 10/1998 | Huberman |
| 5,835,896 A | 11/1998 | Fisher et al. |
| 5,845,265 A | 12/1998 | Woolston ...................... 705/37 |
| 6,012,045 A | 1/2000 | Barzilai et al. ............... 705/37 |
| 6,112,186 A * | 8/2000 | Bergh et al. .................. 705/10 |

FOREIGN PATENT DOCUMENTS

EP        0952536 A1 * 10/1999  .......... G06F/17/60

OTHER PUBLICATIONS

Cyberscope, "Cyberscope: High–Tech Hock", Mar. 1999.*
Business Wire, "US Pawn and Sirco International Announce Agreement on Development and Launch of Internet Auction Site", Mar. 18, 1999.*
"Information on the Pawn Industry", http://pages.prodigy.net/goodtrader/inforpawn.htm.*
PR Newswire, "ExperTelligence Releases Online Auction Comparison for WebData.com", Dec. 30, 1998.*
"Auction Universe", (http://www.auctionuniverse.com) download date Jan. 20, 1999.
BIDFIND (Adding the Power!), (HTTP://WWW.BIDFIND.COM) download date Feb. 18, 1999.
"eBay–Your Personal Trading Community", (http://www.e-bay.com) download date Feb. 18, 1999.

(List continued on next page.)

*Primary Examiner*—Robert P. Olszewski
*Assistant Examiner*—Bryan Saketic
(74) *Attorney, Agent, or Firm*—Dean P. Alderucci (57) ABSTRACT

Information is received about a post for an item to be sold. The information may include, for example, the class and type of item being sold, the reputation of a seller, a floor price below which the item will not be sold, a condition of the item and peripherals included with the item. Based on the received information, a posting payment amount is determined.

55 Claims, 11 Drawing Sheets

OTHER PUBLICATIONS

"eBAY New Item", (http://pages.ebay.com/aw/newitem.html), download date Feb. 18, 1999.

"eBAY User Agreement—Fees and Credits", (http://pages.ebay.com/aw/agreement-fees.html), download date Feb. 18, 1999.

"Welcome to Just Glass Auctions", (http://justglass.com/main.cfm), download date Feb. 18, 1999.

"Welcome to the NEW REVOLUTION IN AUCTIONING!",, (http:www.netcollect.com/newhome/new-bottom.htm) download date Feb. 18, 1999.

"World–Wide Collectors Digest", (http://www.wwcd.com/home.html) download date Feb. 18, 1999.

"Just Glass Action Rules", (http://justglass.com/docs/Seller_Info.HTM), download date Feb. 18, 1999.

"Netcollect.Com . . . Where The World Shops Collectibles!", (http://auction.netcollect.com/cgi . . . how_page.pl?page), download date Feb. 18, 1999.

* cited by examiner

| NAME 310 | FINANCIAL ACCOUNT IDENTIFIER 320 | SATISFIED BUYERS 330 | UNSATISFIED BUYERS 340 | REPUTATION PERCENTAGE 350 |
|---|---|---|---|---|
| HOLLY SELLER | 1111-1111-1111-1111 | 18 | 1 | 94.7% |
| JOHN SMITH | 222-2222-2222-2222 | 6 | 2 | 75.0% |

FIG. 3

| | ITEM 1 | ITEM 2 | ITEM n |
|---|---|---|---|
| ITEM ID | | | |
| ITEM CLASS | | | |
| ITEM TYPE | | | |
| GRADE | | | |
| PERIPHERAL 1 | | | |
| PERIPHERAL 2 | | | |
| PERIPHERAL n | | | |
| EXPECTED SELLING PRICE | | | |
| FLOOR PRICE | | | |
| INITIAL BID | | | |
| TOTAL NO. OF BIDS | | | |
| TOTAL TIME OF AUCTION | | | |
| FINAL BID AMOUNT | | | |

FIG. 4

| NAME 510 | SELLER IDENTIFIER 520 | ADDRESS 530 | FINANCIAL ACCOUNT IDENTIFIER 540 | ITEM IDENTIFIER 550 | ITEM CLASS 560 | ITEM TYPE 570 |
|---|---|---|---|---|---|---|
| HOLLY SELLER | 18 | 111 PARK AVE. NEW YORK, NY 10023 USA | 1111-1111-1111-1111 | I-123 | CAMERA | NIKO 250 |

| ITEM CLASS 710 | PERIPHERAL 1 720 | PERIPHERAL 2 730 | PERIPHERAL 3 740 |
|---|---|---|---|
| BOOK | LEATHER BINDING + $18.00 | SIGNED (LIVING) + $15.00 | SIGNED (DEAD) + $36.00 |
| CAMERA | CASE + $8.00 | FLASH + $22.00 | TRIPOD + $17.00 |
| WATCH | LEATHER BAND + $17.00 | ORIGINAL BAND + $12.00 | NONE |

FIG. 7

| PRICE FLOOR 810 | HISTORIC SALES 820 | COMMISSION PERCENTAGE 830 | POSTING PAYMENT AMOUNT 840 |
|---|---|---|---|
| $200.00 | 80% | 10% | $6.00 |
| $250.00 | 65% | 10% | $6.25 |
| $300.00 | 40% | 10% | $2.00 |

SYSTEM AND METHOD FOR DETERMINING A POSTING PAYMENT AMOUNT

This application is a continuation-in-part of application Ser. No. 08/964,967, filed Nov. 5, 1997, which is a continuation-in-part of application Ser. No. 08/889,319, filed Jul. 8, 1997.

The present invention relates to the sale of products. In particular, the present invention relates to a system and method for determining a posting payment amount.

BACKGROUND OF THE INVENTION

A large market exists to help people transact "person-to-person" commerce. For example, a person may wish to sell an item, such as a camera, that he or she owns but no longer uses. Although the item could be sold to a used-item store, a better price often results if the item is instead sold directly to another person. The seller, however, is typically not able to determine a reasonable price for the item. The item could be compared to similar items being offered for sale, such as in the classified advertisements section of a newspaper, but the specific item model, the condition of the item and any peripherals included with the item may make such a comparison difficult.

To make sure that an item is being sold at a reasonable price, it is important that the item is offered to a large audience of potential buyers. Similarly, to make sure that a good selection of items are offered at reasonable prices, it is important that many sellers offer items for sale. As a result, "on-line" person-to-person commerce services that can connect a large number of potential sellers and buyers, such as World Wide Web sites provided through the Internet, have become increasingly popular.

Two types of such on-line services will now be briefly described. In a classified advertisement, or "classifieds," type of service, a seller can advertise ("post") an item to be sold at a particular price. When a buyer agrees to purchase the item at that price, the item is sold to the buyer. The post (i.e. the advertisement) may include, for example, the type of item, the condition of the item, any peripherals included with the item, and the price of the item.

In an "auction" type of on-line service, a seller posts an item to be sold by auction. A post for an auction would include, for example, the type of item, the condition of the item, any included peripherals, but would not include a price of the item. A number of buyers can submit bids for that item, and the item is then sold to the bidder that submits the highest bid price. Such a posting service can let a seller set a "floor price" for the item. That is, the item will not be sold below the floor price even if no higher bids are submitted. The floor price would not be disseminated to potential bidders.

Both the classifieds and auction types of posting services may find it difficult, however, to attract sellers. Although many people own items they no longer use, there is no immediate incentive for them to place those items on sale. Moreover, there are a growing number of posting services to choose from, resulting in competition among services to attract sellers.

These factors have caused some posting services to pay sellers a fixed amount in exchange for posting an item to be sold. For example, a posting service may pay a seller $1.00 for each item that is posted. This arrangement, however, has several disadvantages. In particular, different types of items may not be equally important to a posting service. For example, a posting service may want to specialize in, or expand the number of postings with respect to, computer equipment. In this case, a post for a computer monitor and a post for an antique doll, which is less important to the posting service, will both cost the posting service the same amount. Unscrupulous sellers may even post trivial items merely to obtain the fixed amount in exchange.

Similarly, the value of items being sold may make some posts more attractive to the posting service. Many posting services make a profit by charging the seller a commission on the final sale price of the item. In this case, a posting for an item that is reasonably priced at $1,000 will be more important to the posting service than a posting for an item that is reasonably priced at $10. Paying an equal amount for both posts, however, will not encourage people to submit the more valuable items to be sold. Other factors, such as the reputation of a seller, may also be important to the posting service.

Another disadvantage with paying a fixed fee for a post is that the fee is paid to the seller even if the item is never sold. That is, the posting service paying the fixed fee may never receive a commission. Accordingly, a reasonable posting for an item at $100 may be worth more to the posting service than an unreasonable posting for a similar item at $1,000 since the unreasonable posting is unlikely to sell, and thus unlikely to result in a commission.

Thus, a need exists for a system and method that encourages a seller to post an item for sale, especially at a reasonable price.

U.S. Pat. No. 3,581,072 to Nymyer is directed to a computer-managed auction market system. The Nymyer patent does not address the determination of a fee to be provided to a seller in return for posting an item to be sold. Similarly, U.S. Pat. No. 5,732,400 to Mandler et al. provides a clearinghouse to enable on-line transactions between sellers and buyers. Mandler et al. determines a discount fee based on the reputation of the buyer, but does not disclose offering the seller an incentive to post an item for sale.

SUMMARY OF THE INVENTION

To alleviate the problems inherent in the prior art, the present invention introduces systems and methods for determining a posting payment amount.

In one embodiment of the present invention, information is received about a post for an item to be sold. Based on the received information, a posting payment amount to be paid to sellers in exchange for posting is determined.

With these and other advantages and features of the invention that will become hereinafter apparent, the nature of the invention may be more clearly understood by reference to the following detailed description of the invention, the appended claims and to the several drawings attached herein.

DETAILED DESCRIPTION OF THE INVENTION

Figure 1:
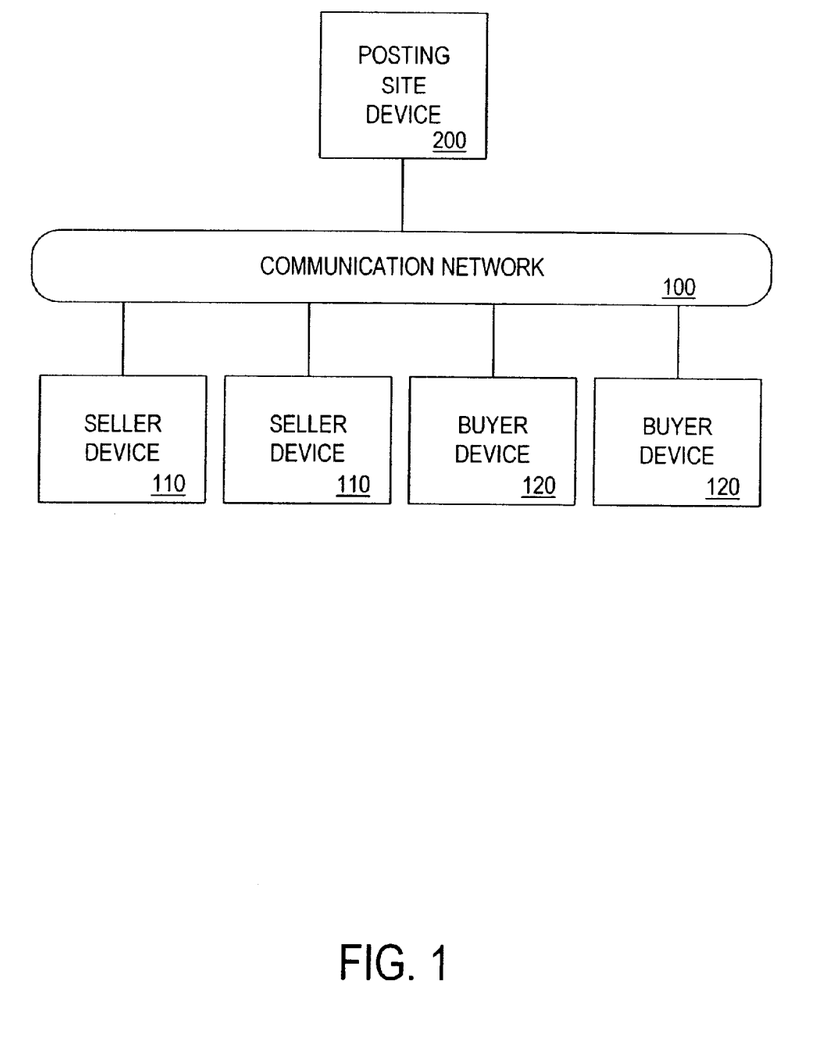
FIG. 1 is a block diagram overview of a system for determining a posting payment amount according to an embodiment of the present invention.

The present invention is directed to systems and methods for determining a posting payment amount, which is an amount paid to a seller in exchange for posting. Turning now in detail to the drawings, FIG. 1 is a block diagram overview of a system for determining a posting payment amount according to an embodiment of the present invention. The system includes a number of seller devices 110 and buyer devices 120 coupled to a posting site device 200 through a communication network 100. The seller devices 110 and the buyer devices 120 may be, for example, Personal Computers (PCs), Personal Digital Assistants (PDAs), wired or wireless telephones, or any other appropriate communication device. The communication network 100 may be, for example, a Local Area Network (LAN), a Wide Area Network (WAN), a wireless network, a Public Switched Telephone Network (PSTN), or an Internet Protocol (IP) network such as the Internet, an intranet or an extranet. In one embodiment, seller PCs and buyer PCs may communicate with a Web-based posting site server through the Internet 100.

According to an embodiment of the present invention, the posting site device 200 determines a posting payment amount based on information received about a post for an item to be sold. Consider a seller who wishes to sell an item. As used herein, an "item" may comprise, for example, any good or service, such as a second-hand consumer electronic device. Other examples of items include hotel rooms, car rental services, concert and other event tickets, new merchandise, and second-hand products, such as collectibles.

The seller may use a seller device 110 to send, through the communication network 100, information about the item to be sold. The seller may transmit to the posting site device 200 one or more of: the seller's identity; the type of item to be sold; the condition of the item; peripherals included with the item; and a "floor price," i.e., a price below which the item will not be sold.

According to an embodiment of the present invention, the posting site device 200 determines, based on the received information, a "posting payment amount." As used herein, a "posting payment amount" may comprise, for example, an amount of money to be paid to the seller in return for posting the item to be sold.

According to other embodiments of the present invention, the posting payment amount may be negative, that is the seller may pay money to the posting site in return for posting the item, or may comprise a series of payments, such as payment for every ten bids received for the item.

If the posting site wishes to encourage posts for a certain type of item, the posting payment amount may be based on the type of item being sold. For example, to promote posts for cameras, the posting site device may determine higher posting payment amounts for cameras and lower posting payment amounts for e.g. computer equipment.

According to another embodiment of the present invention, the posting site may want to encourage sellers to use reasonable floor prices. For example, if a floor price is too high, the item may never be sold and the posting site will not collect a commission. Therefore, the posting site device 200 may offer a higher posting payment amount if the seller has selected a reasonable floor price. Similarly, the posting site device 200 may use other parameters to determine a posting payment amount, such as a profit to be made by the posting site if the item is sold.

According to another embodiment of the present invention, the posting site may base the posting payment amount on previous posts provided by the seller. For example, the posting payment amount may be determined based on: how quickly items previously posted by the seller have been sold; the number of the seller's pending or current posts; or the number of bids submitted in response to the seller's previous posts. The reputation of the seller may also be used to determine the posting payment amount, according to another embodiment of the present invention.

In accordance with the present invention, the information about the post for the item to be sold may include account information such as a financial account identifier that identifies an account of the seller to be credited or debited. For example, the seller may provide credit, debit, Automated Teller Machine (ATM), or "smart" card information to the posting site device 200. This information can then be used to electronically provide the posting payment amount to the seller. The posting payment amount may provide to a seller, for example, when the item is posted, when a bid is received for the item, or when the item is sold.

In an alternate embodiment the payment posting amount may be provided to a party other than the seller. In such as alternate embodiment, the seller provides to the posting site a financial account identifier identifies an account of the party other than the seller. The other party may comprise an individual or an organization such, as a charity, whom the seller desires to benefit from the sale of the item. For some sellers, the benefit to the other party is just as motivating, or more motivating than a comparable benefit to themselves.

According to another embodiment of the present invention, the determination of a posting payment amount may be "automatically" performed by the posting site device 200. As used herein, the terms "automatic" and "automatically" refer to actions that are not performed in an entirely manual way. According to another embodiment of the present invention, the determination may be made manually, on an ad hoc basis, by an operator of the system. According to still another embodiment of the present invention, the determination may be "dynamically" performed by the posting site device 200. As used herein, the terms "dynamic" and "dynamically" refer to actions that are performed in substantially real-time.

When a seller agrees to post an item to be sold, the posting site device 200 makes the post known to potential buyers (e.g. by displaying via a buyer device). The posting device 200 may eventually arrange to the sell the item to a buyer that views the post using a buyer device 120. If so, the posting site device 200 can credit the seller's account appropriately and retain a commission. If desired, the posting payment amount may be deducted from the sale price or floor price. By way of example only, the posting site device 200 may pay to the seller one of: a winning bid amount; the bid amount minus the posting payment amount; a floor price; the floor price minus the posting payment amount; the floor price plus a percentage of the difference between the floor price and the bid amount; and the floor price, plus a percentage of the difference between the floor price and the bid amount, minus the posting payment amount.

Figure 2:
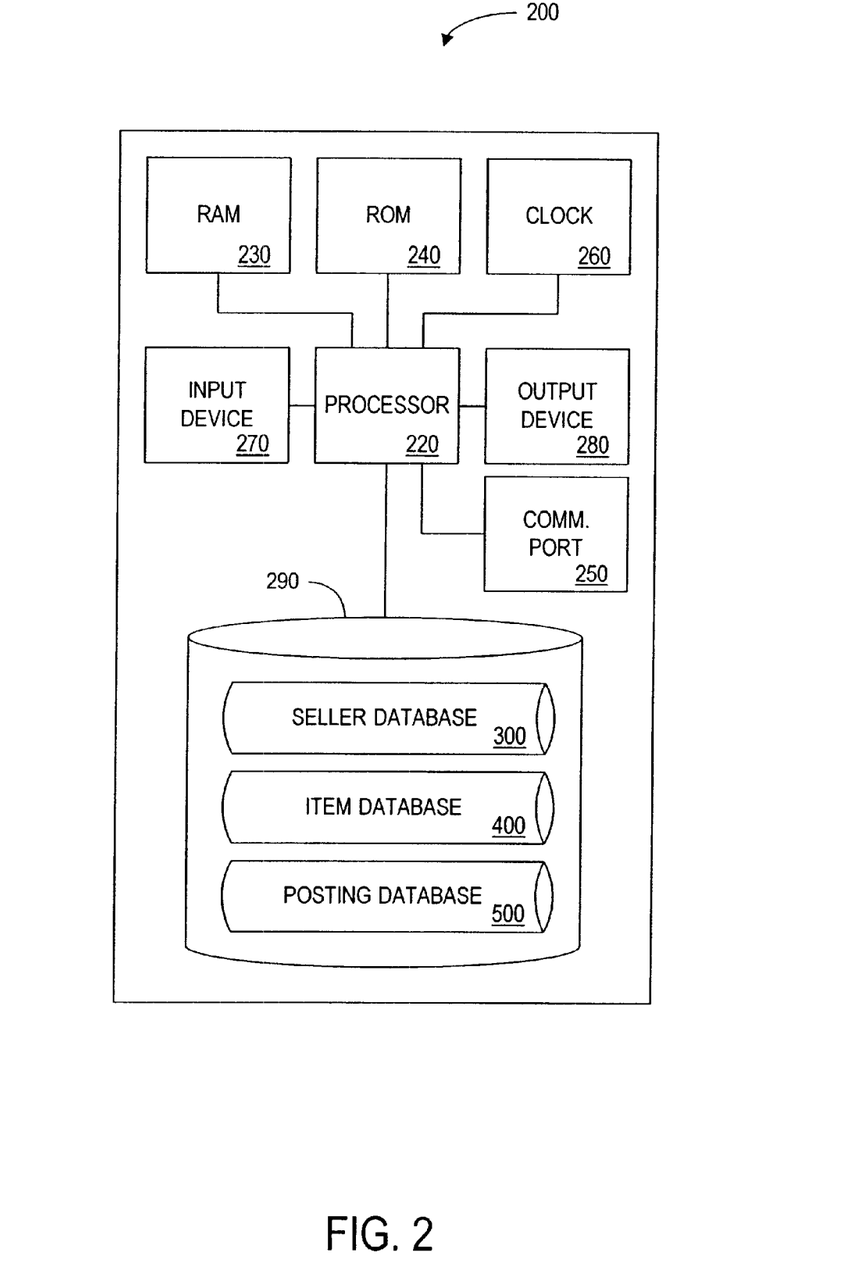
FIG. 2 is a block schematic diagram of the posting site device shown in FIG. 1 according to an embodiment of the present invention.

FIG. 2 is a block schematic diagram of the posting site device 200 shown in FIG. 1 according to an embodiment of the present invention. The posting site device 200 includes a processor 220 coupled to: a clock 260; a network communication port 250—which in turn is coupled to a network; and "memory units" comprising a Random Access Memory (RAM) 230 and a Read Only Memory (ROM) 240. An input device 270, an output device 280 and a storage device 290, such as a hard disk, are also coupled to the processor 220.

The memory units 230, 240 and/or the storage device 290 may store instructions adapted to be executed by the processor 220 to perform at least one embodiment of the present invention. For example, when information about a post for an item to be sold is received through the communication port 250, the memory units 230, 240 and/or the storage device 290 may store instructions adapted to be executed by the processor 220 to determine, based on the received information, a posting payment amount. Note that, as used herein, information may be "received" by, for example: (1) the posting site device 200 from a seller device 110; or (2) a software application or module within the posting site device 200 from another software application or module within the posting site device 200, or from any other source.

For the purposes of this application, the memory units 230, 240 and storage device 290 could include any medium capable of storing information and instructions adapted to be executed by a processor. Some examples of such media include, but are not limited to, floppy disks, CD-ROM, magnetic tapes, hard disks, and any other device that can store information, such as digital information. In one embodiment, instructions are stored on the medium in a compressed and/or encrypted format. As used herein, the phrase "adapted to be executed by a processor" is meant to encompass instructions stored in a compressed and/or encrypted format, as well as instructions that have to be compiled or installed by an installer before being executed by the processor.

Figure 3:
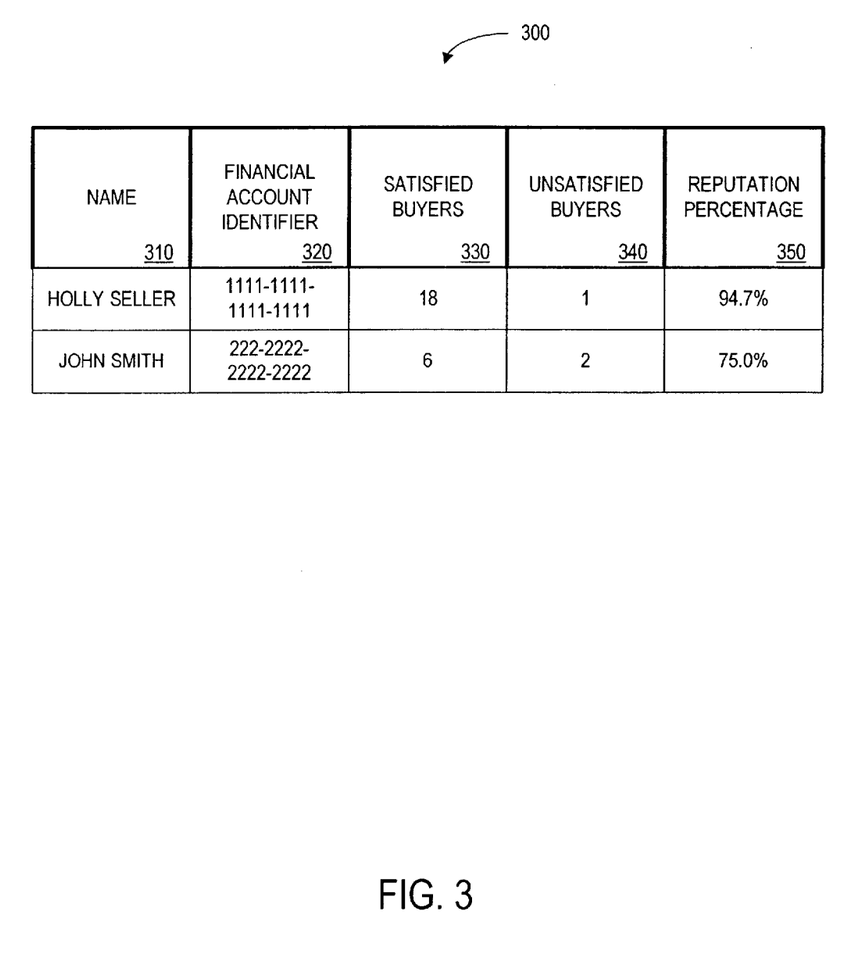
FIG. 3 is a tabular representation of a portion of the seller database shown in FIG. 2 according to an embodiment of the present invention.

As shown in FIG. 2, the storage device 290 contains a seller database 300, described in detail with respect to FIG. 3. The storage device 290 also contains an item database 400, described in detail with respect to FIG. 4, and a posting database 500, described in detail with respect to FIGS. 5, 6A, 6B and 7.

A more detailed description of one embodiment of the present invention will now be provided. As will now be described, information, such as the type of item being sold, the reputation of the seller, the condition of the item, and any peripherals included with the item, may be used to determine an appropriate posting payment amount. It will be apparent to those skilled in the art, however, that other values and embodiments may be implemented instead.

According to this embodiment, the posting site device 200 transmits a blank electronic Request To Sell (RTS) form to a seller device 110 through the communication network 100. The seller, using the seller device 110, enters information about a post into the RTS form and returns the form to the posting site device 200 through the communication network 100. The RTS form may be, for example, an HTML form transmitted through the Internet via a Web site. The completed RTS form may include the seller's identity, such as a user IDENTIFIER number, and the type of item being sold, such as "camera." The type of item being sold may further include an item "class" and "type," such as, for example, that the "camera" (class) being sold is made by a particular manufacturer (type). Further information regarding the item may be entered into the form as well.

The RTS may also include the seller's name and address, telephone number and a credit card number (or other means to provide funds to the seller and/or receive funds from the seller. If desired, the posting site device 200 can validate the corresponding credit card account before continuing the process. The credit card can be used to electronically credit posting payment amounts and sales, and to debit commissions, authentication charges, penalties and fees (such as shipping and handling fees) as desired.

The posting site device 200 then transmits a blank electronic Condition of Item Sheet (CIS) to the seller device 110. The CIS may ask the seller, for example, the condition of the item being sold (such as "mint," "good" or "poor") and what peripherals are included with the item. Note that the particular CIS may be selected based on the type of item described in the completed RTS form. For example, if the RTS form indicates that a camera is being sold, the CIS might request information regarding whether a zoom lens or a camera case is included along with the camera.

Based on the information received from the seller, i.e. on the RTS form and/or the CIS, the posting site device 200 can determine a reputation associated with the seller, such as by sending a query to the seller database 300. FIG. 3 is a tabular representation of a portion of the seller database 300 shown in FIG. 2 according to an embodiment of the present invention. As shown in FIG. 3, the seller database 300 has multiple data categories. For example, the seller database 300 may include a name 310 and a credit card number 320 associated with the seller. The credit card number allows the seller to easily receive the posting payment amount and/or proceeds from a sale. The seller database 300 may also include a number of satisfied buyers 330, a number of unsatisfied buyers 340 and a reputation percentage 350.

The first seller that is represented in FIG. 3 has completed nineteen sales with only a single unsatisfied buyer and is assigned a reputation of 94.7% as follows:

100*(total number of sales)/(number of unsatisfied customers).

On the other hand, the second seller has completed eight sales with two unsatisfied buyers and is assigned a reputation of 75%. In this case, a higher posting payment amount may be offered to the first seller as compared to the second seller, even when both are selling identical items. Moreover, the reputation of a seller may change the final selling price of an item—a seller with a poor reputation may receive few offers. Of course, if the seller has not previously sold an item, a new entry in the seller database 300 can be created and a "default reputation" percentage may be assigned.

Figure 5:
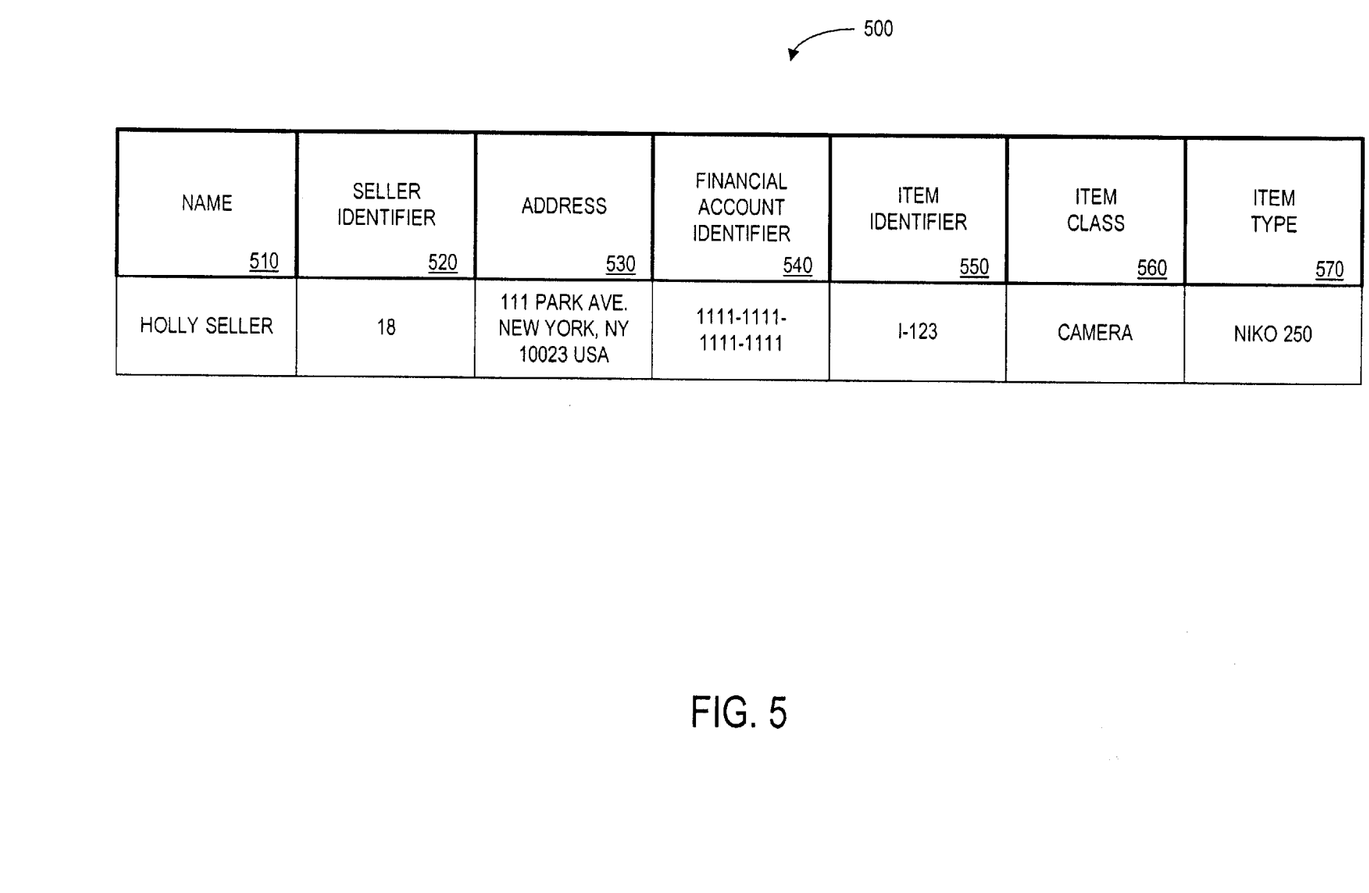
FIG. 5 is a tabular representation of a request to sell portion of the posting database shown in FIG. 2 according to an embodiment of the present invention.

Using the information received from the seller, the posting site device 200 creates an entry in the posting database 500. FIG. 5 is a tabular representation of a RTS portion of the posting database 500 shown in FIG. 2 according to an embodiment of the present invention. As shown in FIG. 5, the RTS portion includes a name 510, a seller identifier 520, an address 530, an account identifier 540, an item identifier 550, an item class 560 and an item type 570.

Figure 4:
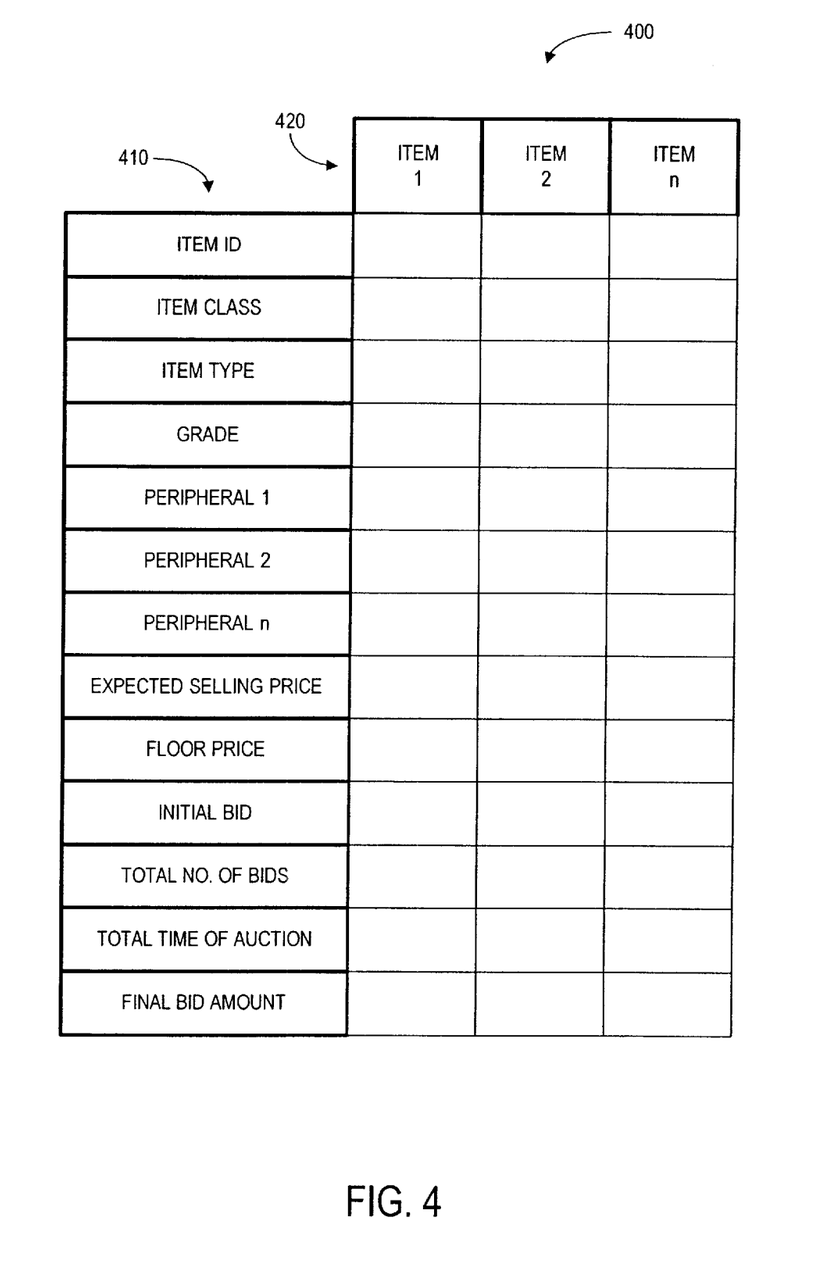
FIG. 4 is a tabular representation of a portion of the item database shown in FIG. 2 according to an embodiment of the present invention.

Based on the information in the posting database 500, the posting site device 200 can examine past posts for the same class and type of item, e.g. a camera made by a particular manufacturer. For example, FIG. 4 is a tabular representation of a portion of the item database 400 shown in FIG. 2 according to an embodiment of the present invention. As shown in FIG. 4, the item database 400 includes information about previous and current items or posts, comprising multiple data categories 410 (such as an item identifier and class) for multiple items 420 (such as items 1 through n). In this case, the value of the item to be posted can be estimated and used to determine a posting payment amount. The posting site device 200 may estimate the value of the item based on, by way of example only, sales during the past year for the item, the last fifteen similar items sold, or a trend analysis for sales of similar items. Advertisements for each item may be generated based on some of the information in the item database 400. For example, an HTML document may be generated to the item description, peripherals and asking price if appropriate.

Figure 6A:
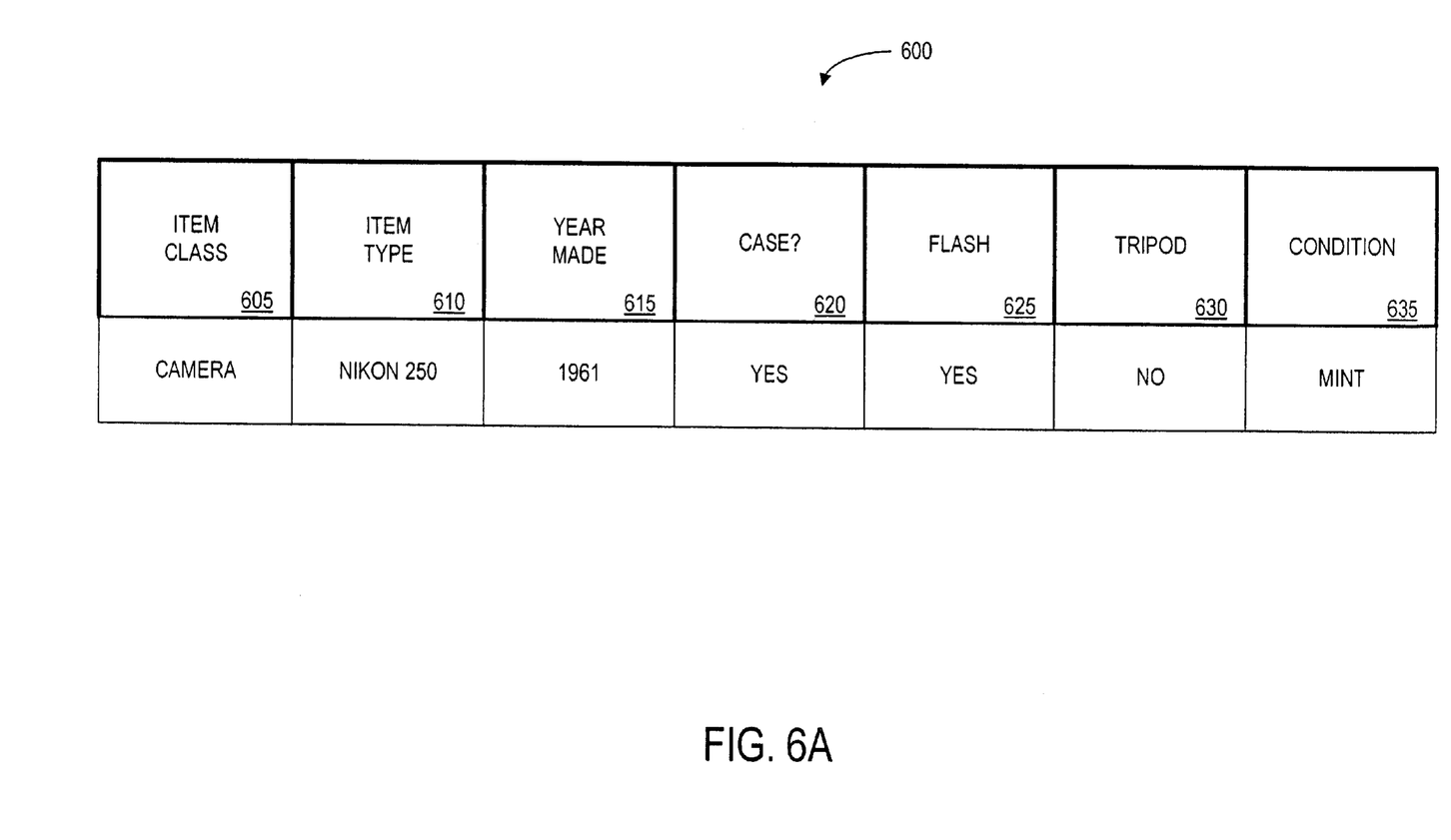
FIGS. 6A and 6B are tabular representations of a condition of item sheet portion and a condition pricing table of the posting database shown in FIG. 2 according to an embodiment of the present invention.
Figure 6B:
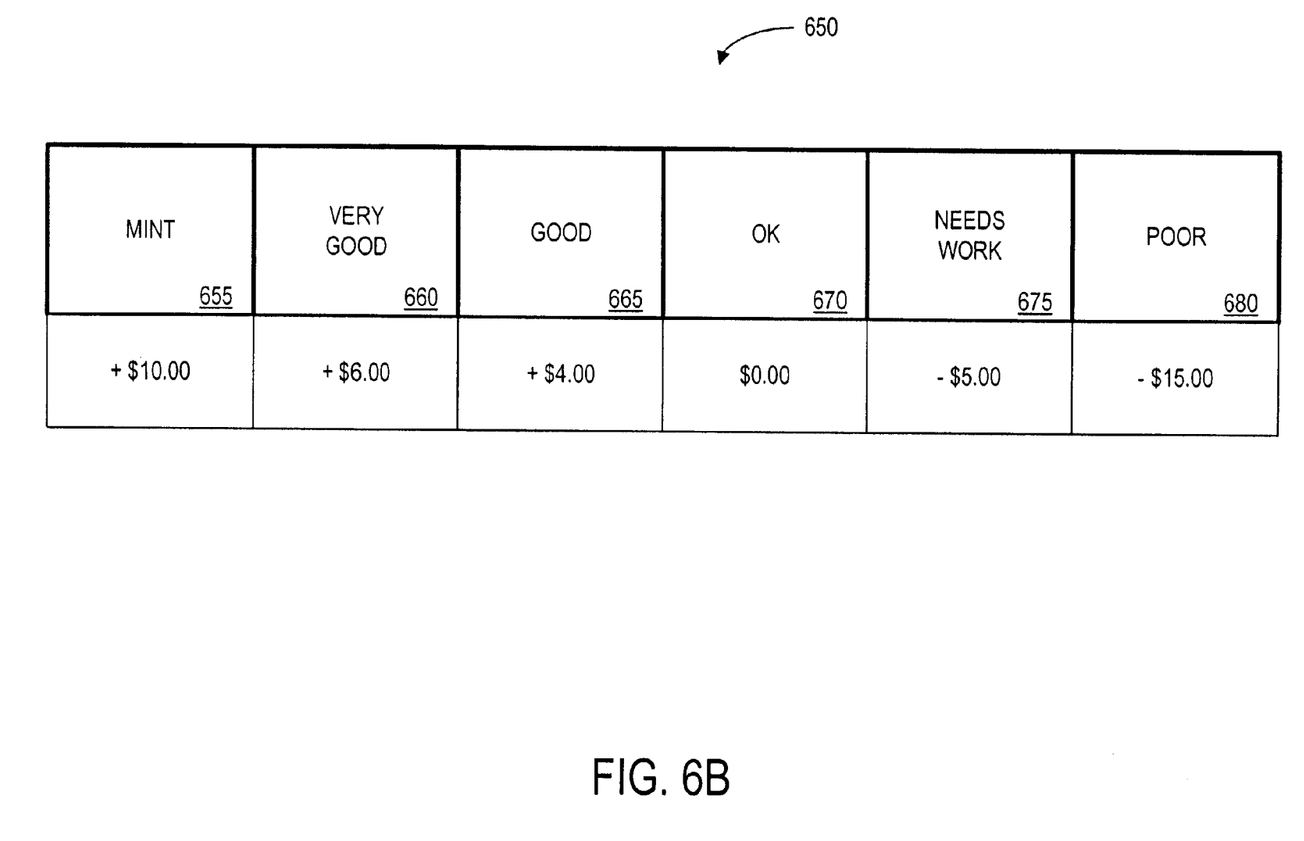

The condition of an item being sold may also be used to determine the expected value. FIGS. 6A and 6B are tabular representations of a CIS table 600 and a condition pricing table 650 of the posting database 500 shown in FIG. 2 according to an embodiment of the present invention. As shown in FIG. 6A, the CIS includes an item class 605, an item type 610, a year made 615 and an item condition 635. As shown in FIG. 6B, the condition pricing table includes a number of condition classes and associated price adjustments. In particular, the condition pricing table includes "mint" 655, "very good" 660, "good" 665, "OK" 670, "needs work" 675 and "poor" 680 condition classes and associated price adjustments. For example, a camera that would otherwise be expected to sell for $100, may be adjusted to have an expected selling price of $106 if it is in "very good" condition ("+$6"). There may be different condition of item tables for different items.

According to another embodiment of the present invention, the peripherals included with an item may be used to determine the expected selling price and/or the posting payment amount. For example, the expected selling price may be determined as follows:

$$\text{expected selling price} = \text{base price} + \text{peripheral values},$$

where the base price is the price the item usually sells for by itself. This base price is then adjusted based on the dollar value of each peripheral.

Figure 7:
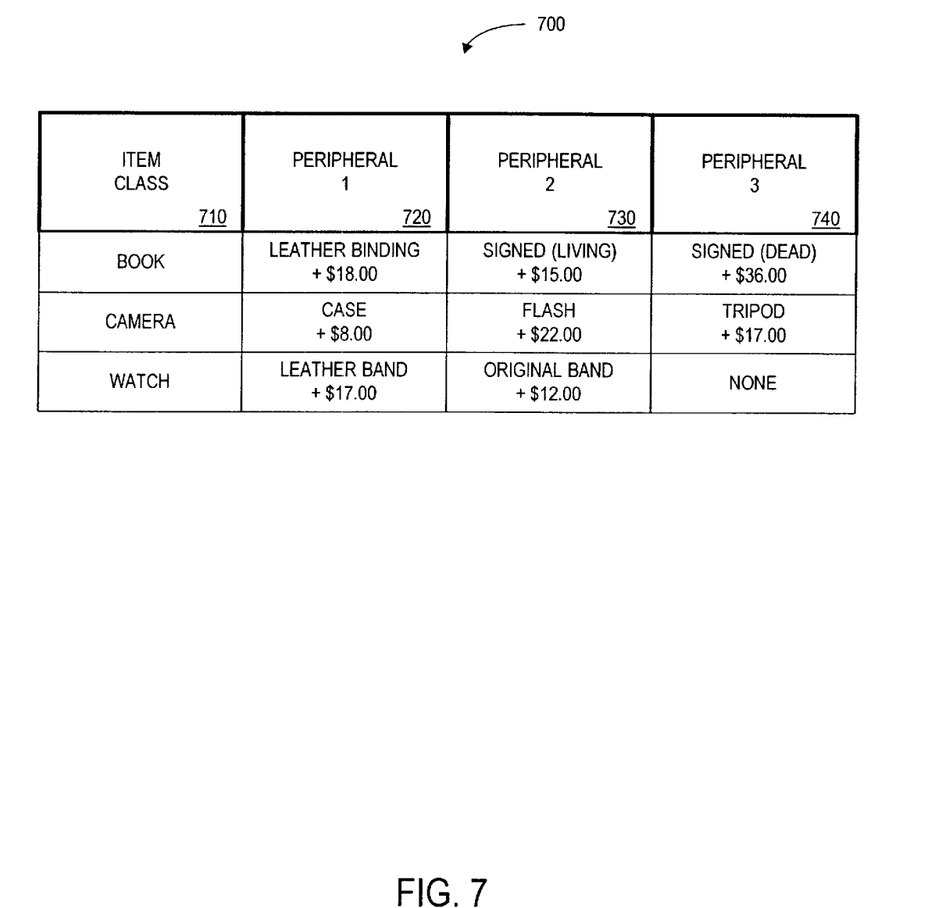
FIG. 7 is a tabular representation of a peripheral pricing portion of the posting database shown in FIG. 2 according to an embodiment of the present invention.

The condition of item sheet portion of the posting database 500 may include entries related to peripherals included with the item being sold. For example, as shown with respect to the camera in FIG. 6A, the peripherals include a case 620, a flash 625 and a tripod 630. FIG. 7 is a tabular representation of a peripheral pricing portion of the posting database 500 according to this embodiment of the present invention. The peripheral pricing table includes an item class 710, a peripheral one 720, a peripheral two 730 and a peripheral three 740. Although, any number of peripherals may be referenced. For example, a camera having a base price of $100 may be assigned an expected selling price of $130 if a case ("+$8") and a flash ("+22") are included.

Other values that may be used to determine the expected selling price and/or the posting payment amount include the seller's reputation and the number of similar items currently posted on the site. For example, a good reputation may increase the expected selling price, but a large number of similar items on the site may decrease the expected selling price.

If items in the same class, but not of the same type, have been previously posted or sold, the information about other posts in that class can be used to determine the value of the item. If no items of that type or class have previously been sold, a default value set by the posting site or the seller can be used.

An item posted with a floor price that is too high is less likely to sell, and less likely to sell quickly. An item posted with a floor price that is too low, however, may result in a reduced sale price to the seller and a reduced commission to the posting site. Therefore, the posting site and the seller both benefit from a reasonable floor price. By adjusting the posting payment amount, the posting site can encourage a seller to post an item using a reasonable floor price. One way this may be done is as follows:

$$\text{floor price} = (\text{expected selling price}) * (X\%) * (Y\%),$$

where X is a percentage of the expected selling price used by the posting site to encourage people to purchase or bid for the item. Different item classes and types of items may have different values for X. Y represents a reputation score for the seller, as described with respect to FIG. 7.

According to another embodiment of the present invention, the seller is allowed to determine the price floor price. The seller, may, for example, select a floor price from a range of floor prices suggested by the posting site. In this case, different floor prices can be associated with different posting payment amounts.

Figure 8:
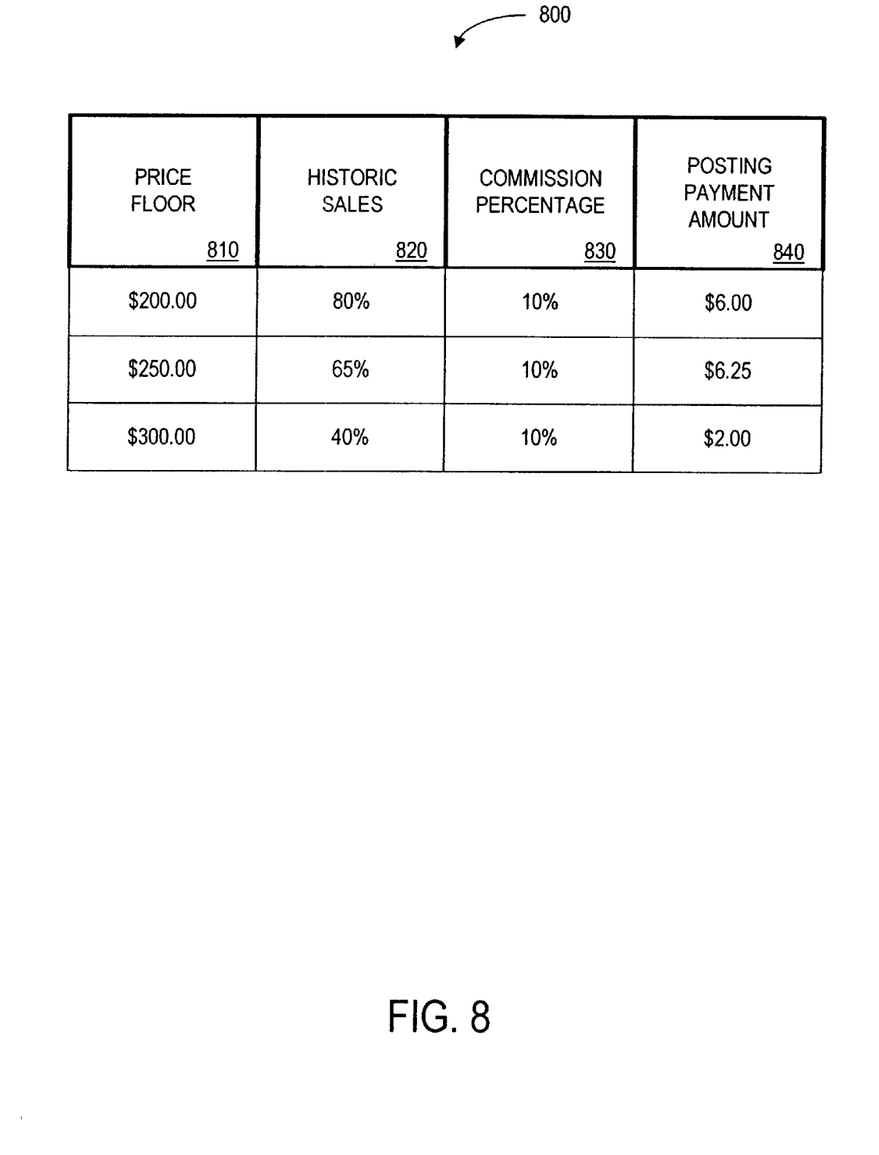
FIG. 8 is a tabular representation illustrating a relationship between floor prices, previous posting information, and posting payment amounts according to an embodiment of the present invention.

FIG. 8 is a tabular representation illustrating a relationship between floor prices, previous posting information, and posting payment amounts according to an embodiment of the present invention. As shown in FIG. 8, the historic sales 820 of the item indicate that similar items sell 80% of the time if the floor price 810 is set to $200. That same item may sell 65% of the time if the floor price 810 is set to $250 and 40% of the time if the floor price 810 is set to $300. The commission percentage 830 and/or the posting payment amount 840 may therefore be adjusted, based on the floor price 810 selected by the seller, to encourage a reasonable value. For example, the posting payment amount 840 may be reduced from $6.25 to $2.00 if the seller insists on a floor price 810 that significantly reduces the chance that the item will be sold.

According to one embodiment of the present invention, a table such as the one shown in FIG. 8 is displayed to the seller to allow the seller to select his desired floor price and corresponding posting payment amount. According to another embodiment of the present invention, the posting site device 200 lets the seller select a floor price, but suggests, or counter-offers with, a different floor price to the seller, perhaps with a higher posting payment amount. The seller can instead be given historical data so he can better determine a reasonable floor price. Such services may be provided to the seller for an additional fee, if desired.

According to another embodiment of the present invention, the system determines the posting payment amount based on the expected value of the item to be sold, without regard to the floor price. In this case, the expected value, and therefore the posting payment amount, may or may not be adjusted based on, for example, the type of item being sold, the value of similar items that have been sold, the reputation of the seller, the condition of the item and the peripherals included with the item.

According to another embodiment of the present invention, the posting payment amount may be a negative value. For example a seller with a poor reputation may be charged to post items for sale.

According to another embodiment of the present invention, a first-time seller may be paid more, or less, than a seller who has posted before. Similarly, a seller that frequently posts items for sale, or that currently has a large number of items posted for sale, may be paid more, or less, than a seller that infrequently posts items. A seller who has been profitable for the posting site may be paid more than a seller who has not. For example, a seller who has posted items that have sold quickly may be paid more than a seller who has posted items that have not sold quickly or at all.

According to still another embodiment of the present invention, the posting payment amount may be determined based on the number of bids received for that post, or for other posts previously submitted by the seller. For example, the posting payment amount may be $1.00 for every one hundred bids. In this case, the posting payment amount may be incrementally paid to the seller, $1.00 at a time. Similarly, different classes of posting payment amounts may be created, such as: ten bids=3% increase in posting payment amount; twenty bids=5% increase in posting payment amount.

According to another embodiment of the present invention, the posting payment amount may be a modified commission arrangement. For example, if the posting site typically charges a 10% commission on a sale, the site may charge a 9% commission if a reasonable floor price is selected by the seller.

According to another embodiment of the present invention, the posting site may only offer a posting payment amount if the seller indicates an acceptance of modified received information. For example, if the posting site typically sells an item for $80, and a seller posts a similar item with a floor price of $100, the posting site may offer him a payment posting amount in exchange for agreeing to reduce the floor price for the post. Of course, a combination of modified commission arrangements and advance payment amounts may be used to encourage potential sellers.

Note that embodiments of the present invention have been described with respect to, by way of example, transactions transmitted using a Web site. According to other embodiments of the present invention, information may instead be sent using, for example, a telephone, a facsimile machine, e-mail, a Voice Response Unit (VRU), an Interactive VRU, a WebTV interface, or a cable network interface.

After the posting payment amount is determined, the item may be posted by the posting site device 200 (such as by adding the item to the item database 400, and displaying advertisements for the items that are in the item database) and the posting payment amount may be credited to the seller's account.

Figure 9:
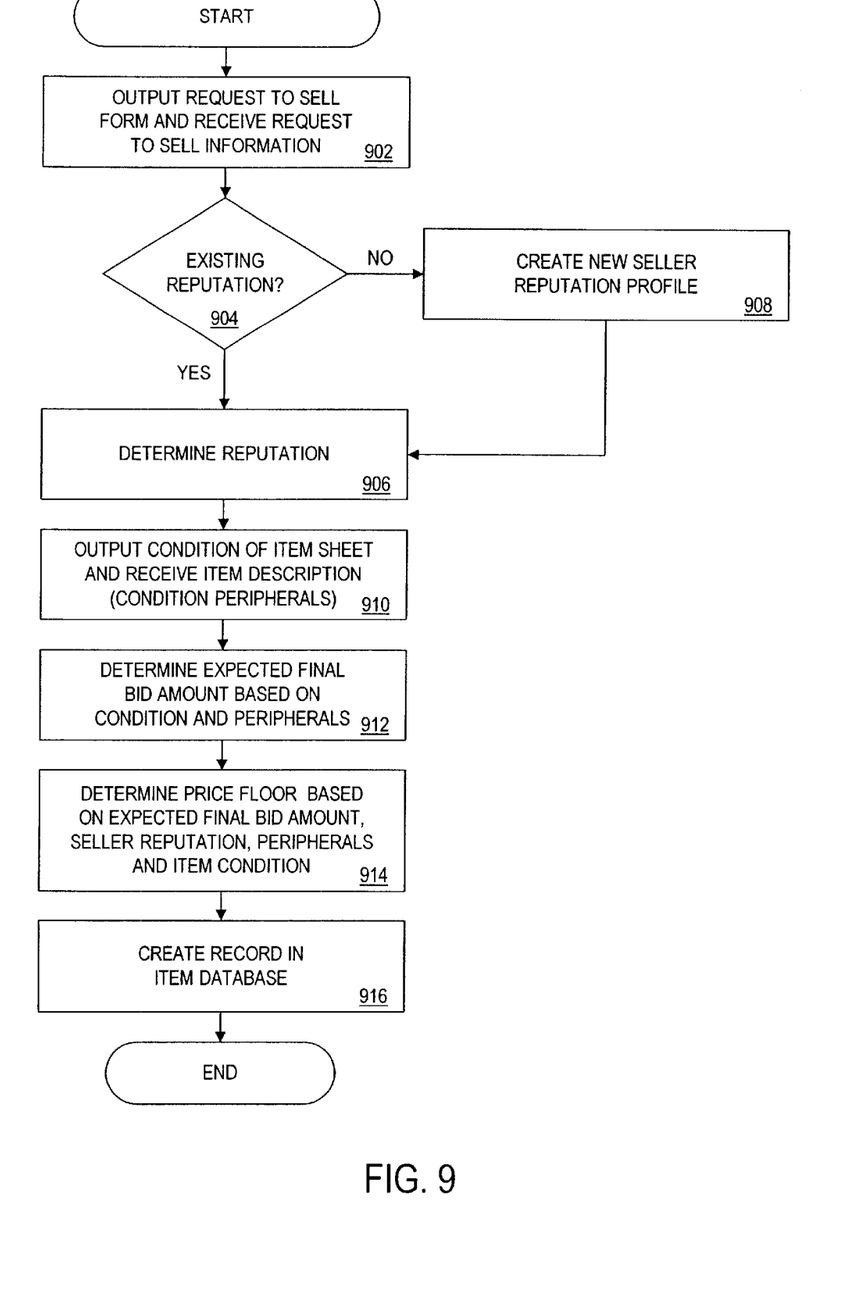
FIG. 9 is a flow chart illustrating a method for receiving a request to sell an item according to an embodiment of the present invention.

FIG. 9 is a flow chart illustrating a method for receiving a request to sell an item according to an embodiment of the present invention. The flow chart in FIG. 9, as well as the other flow charts discussed herein, are not meant to imply a fixed order to the steps; an embodiment of the present invention can be practiced in any order that is practicable. At 902, a blank RTS form is output and a completed RTS form is received by the posting site device, including, for example, an item class and type, the seller's name and financial account information as specified by the seller. If the seller has an existing reputation score with the posting site at 904, the reputation is determined at 906. If the seller does not have an existing reputation score at 904, a new seller profile is created at 908.

At 910, a blank CIS is output and a completed CIS is received by the posting site device, including, for example, the condition of the item and any peripherals included with the item. An expected selling price (or expected final bid amount in the case of an auction) is determined at 912, such as by examining past sales for similar items and adjusting for the condition of the item and the peripherals included with the item. An appropriate floor price is determined at 914, based on the expected selling price and reputation of the seller, and a record for the item is created in a database at 916.

Figure 10:
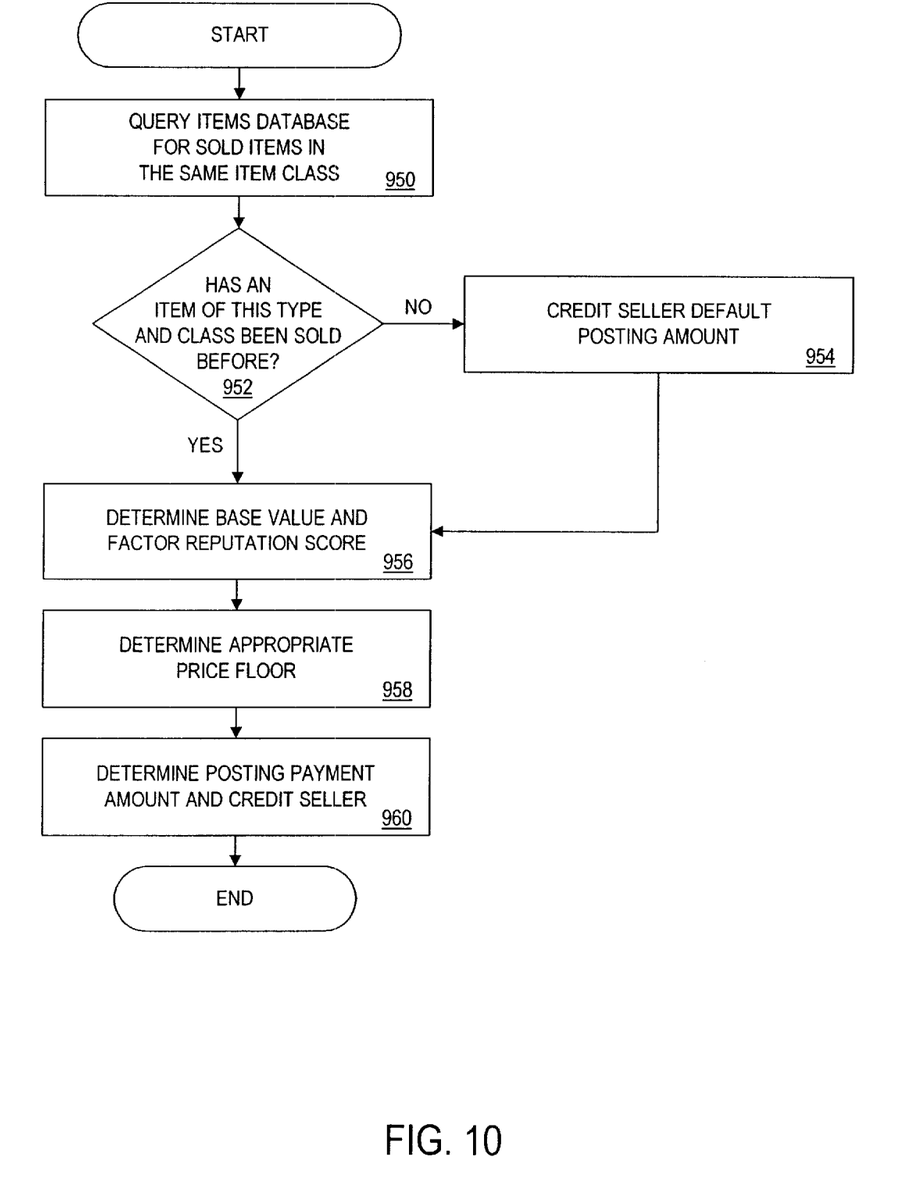
FIG. 10 is a flow chart illustrating a method for determining a posting payment amount according to an embodiment of the present invention.

FIG. 10 is a flow chart illustrating a method for determining a posting payment amount according to an embodiment of the present invention. The process may be executed, for example, when an RTS form and/or a CIS is received by a posting site device. A database is queried at 950 to find items of the same or similar class and type. If it is determined that an item of the same or similar type and class has not been sold before at 952, a default posting payment amount may be credited to the financial account specified by the seller at 954.

If it is determined that an item of the same or similar type and class has been sold before at 952, a base amount, weighted for the condition of the item and peripherals included with the item, is determined and adjusted based on the reputation of the seller at 956. An appropriate floor price is determined at 958 and a posting payment amount is determined and credited to the seller at 960.

The present invention has been described in terms of several embodiments solely for the purpose of illustration. Persons skilled in the art will recognize from this description that the invention is not limited to the embodiments described, but may be practiced with modifications and alterations limited only by the spirit and scope of the appended claims.

What is claimed is:

1. A method for determining an amount to be provided in return for posting an item to be sold, comprising:
    (a) receiving information about a post for the item to be sold; and
    (b) determining, based on the received information, a posting payment amount that is greater than zero.

2. The method of claim 1, wherein the received information comprises a type of item to be sold.

3. The method of claim 2, wherein said determining further comprises evaluating, for similar items, information related to at least one of: (i) received information about previous posts; (ii) previous bids; (iii) previous sale prices; and (iv) previous floor prices.

4. The method of claim 2, wherein the received information further comprises information related to at least one of: (i) a condition of the item to be sold; and (ii) a peripheral associated with the item.

5. The method of claim 1, wherein said receiving comprises receiving the information at a posting site device through a communication network.

6. The method of claim 1, wherein the item is to be sold by auction.

7. The method of claim 1, wherein the received information comprises a floor price below which the item will not be sold.

8. The method of claim 1, wherein the received information comprises an identity of a seller.

9. The method of claim 8, further comprising determining, based on the identity of the seller, a reputation for the seller.

10. The method of claim 1, wherein the received information comprises a reputation of a seller.

11. The method of claim 1, wherein said determining comprises automatically and dynamically determining the posting payment amount.

12. The method of claim 1, wherein said determining is further based on information related to a profit to be made if the item is sold.

13. The method of claim 1, wherein the posting payment amount comprises a series of partial posting payment amounts.

14. The method of claim 1, further comprising:
(c) receiving account information from a seller; and
(d) providing the posting payment amount using the received account information.

15. The method of claim 14, wherein the account information comprises a financial account identifier.

16. The method of claim 14, wherein the step of providing the posting payment amount comprises providing the posting payment amount to the seller using the received account information.

17. The method of claim 1, wherein the posting payment amount comprises a modified commission arrangement.

18. The method of claim 1, wherein the information is received from a seller and the posting payment amount is to be provided to the seller.

19. The method of claim 18, wherein the received information comprises information related to previous posts received from the seller.

20. The method of claim 19, wherein the received information comprises information related to at least one of: (i) how quickly items previously posted by the seller have been sold; (ii) the number of current posts received from the seller; and (iii) the number of bids submitted in response to previous posts received from the seller.

21. The method of claim 18, wherein the received information comprises a commission arrangement selected by the seller.

22. The method of claim 1, further comprising:
(c) providing the posting payment amount to the seller; and
(d) posting the item to be sold.

23. The method of claim 22, wherein the received information comprises a floor price below which the item will not be sold.

24. The method of claim 23, wherein the item is to be sold by auction and further comprising:
(e) receiving from a buyer a bid amount to purchase the item; and
(f) providing to the seller one of: (i) the bid amount; (ii) the bid amount minus the posting payment amount; (iii) the floor price; (iv) the floor price minus the posting payment amount; (v) the floor price plus a percentage of the difference between the floor price and the bid amount; and (vi) the floor price, plus a percentage of the difference between the floor price and the bid amount, minus the posting payment amount.

25. The method of claim 24, further comprising determining whether to accept the received bid amount.

26. The method of claim 22, further comprising updating information related to the seller in a posting history database.

27. The method of claim 1, further comprising:
(c) displaying the determined posting payment amount to a seller.

28. The method of claim 1, wherein said determining comprises determining a plurality of posting payment amounts, each posting payment amount being associated with a posting condition, and further comprising:
(c) displaying the plurality of determined posting payment amounts and associated posting conditions to a seller.

29. The method of claim 28, wherein the posting conditions are floor prices below which the item will not be sold.

30. A method for determining an amount to be provided in return for posting an item to be sold, comprising:
(a) receiving information about a post for the item to be sold;
(b) determining, based on the received information, a posting payment amount, wherein the information is received from a seller and the posting payment amount is to be provided to the seller; and
(c) suggesting to the seller a modification to the received information about a post.

31. The method of claim 30, wherein the posting payment amount is provided to the seller if an acceptance of the modified received information is indicated by the seller.

32. The method of claim 31, wherein the modified received information specifies a floor price that is less than the floor price of the post.

33. A method for posting an item to be sold, comprising:
(a) receiving, from a seller, information about a post for the item to be sold, including a floor price below which the item will not be sold;
(b) determining, based on the received information, a posting payment amount to be provided to the seller, in which the posting payment amount is greater than zero;
(c) providing the posting payment amount to the seller;
(d) posting the item to be sold;
(e) receiving from a buyer a bid amount to purchase the item; and
(f) providing to the seller an amount based on the bid amount.

34. A method for determining an amount to be provided in return for posting an item to be sold, comprising:
(a) receiving from a seller information about a post for the item to be sold;
(b) receiving information about a condition of an item sheet from the seller; and
(c) determining, based on the received information about the item and the information about the condition a posting payment amount to be provided to the seller.

35. A method for selling an item using a communication network, comprising:
(a) providing, through the communication network, information about a post for an item to be sold;
(b) accepting a posting payment amount, the posting payment amount being based on the information provided through the communication network, in which the posting payment amount is greater than zero; and
(c) selling the item.

36. A method for hosting a sale, comprising:
(a) receiving from a first seller information about a post for a first item to be sold;
(b) receiving from a second seller information about a post for a second item to be sold;
(c) paying a first amount to the first seller, in which the first amount is greater than zero;
(d) paying a second amount, different from the first amount, to the second seller, in which the second amount is greater than zero; and
(e) posting the first and second items to be sold.

37. A method for determining an amount to be provided in return for posting an item to be sold, comprising:
(a) receiving from a seller information about a post for the item, the received information comprising a type of item to be sold and an identity of the seller;

(b) accessing a posting history database to estimate a value for the item;

(c) accessing a seller reputation database to determine a reputation of the seller; and (d) determining, based on the estimated value for the item and the reputation of the seller, a posting payment amount to be provided to the seller, in which the posting payment amount is greater than zero.

38. A method for hosting a sale, comprising:

(a) receiving from a seller information about a post for an item to be sold and a requested posting payment amount, in which the requested posting payment amount is greater than zero; and (b) determining, based on the received information, whether or not the requested posting payment amount will be provided to the seller.

39. A medium storing instructions adapted to be executed by a processor to perform a method for determining an amount to be provided in return for posting an item to be sold, said method comprising:

(a) receiving information about a post for the item to be sold; and (b) determining, based on the received information, a posting payment amount that is greater than zero.

40. The medium of claim 39, wherein the received information comprises a type item to be sold.

41. The medium of claim 39, wherein said determining further comprises evaluating, for similar items, information related to at least one of (i) previous posts;

(ii) previous bids; (iii) previous sale prices; and (iv) previous floor prices.

42. The medium of claim 39, wherein the received information further comprises information related to at least one of: (i) a condition of the item to be sold; and (ii) a peripheral associated with the item.

43. The medium of claim 39, wherein the item is to be sold by auction.

44. The medium of claim 39, wherein the received information comprises information related to at least one of: (i) a floor price below which the item will not be sold; and (ii) a reputation of a seller.

45. The medium of claim 39, wherein said determining comprises automatically and dynamically determining the posting payment amount.

46. The medium of claim 39, wherein said receiving is performed by receiving the information at a posting site device through a communication network.

47. The medium of claim 39, wherein the posting payment amount comprises at least one of: (i) a negative amount; and (ii) a modified commission arrangement.

48. The medium of claim 39, wherein the information is received from a seller and the posting payment amount is to be provided to the seller.

49. The medium of claim 39, wherein the received information comprises information related to at least one of: (i) how quickly items previously posted by the seller have been sold; (ii) the number of current posts received from the seller; (iii) the number of bids submitted in response to previous posts received from the seller; and (iv) a commission arrangement selected by the seller.

50. The medium of claim 39, wherein the method further comprises:

(c) providing the posting payment amount to the seller; and (d) posting the item to be sold.

51. The medium of claim 39, wherein the received information comprises a floor price below which the item will not be sold.

52. The medium of claim 51, wherein the item is to be sold by auction, and wherein the method further comprises:

(c) receiving from a buyer a bid amount to purchase the item; and (d) providing to the seller one of: (i) the bid amount; (ii) the bid amount minus the posting payment amount; (iii) the floor price; (iv) the floor price minus the posting payment amount; (v) the floor price plus a percentage of the difference between the floor price and the bid amount; and (vi) the floor price, plus a percentage of the difference between the floor price and the bid amount, minus the posting payment amount.

53. The medium of claim 39, further comprising:

(c) displaying the determined posting payment amount to the seller.

54. The medium of claim 39, wherein said determining comprises determining a plurality of posting payment amounts, each posting payment amount being associated with a posting condition, and further comprising:

(c) displaying the plurality of determined posting payment amounts and associated posting conditions to the seller.

55. An apparatus to determine an amount to be provided in return for posting an item to be sold, comprising:

(a) a processor; and (b) a storage device storing instructions adapted to be executed by said processor to:

(i) receive information about a post for the item to be sold, and (ii) determine, based on the received information, a posting payment amount that is greater than zero.

* * * * *